(12) United States Patent
Lockhart, Jr.

(10) Patent No.: US 7,664,867 B2
(45) Date of Patent: Feb. 16, 2010

(54) REPORTING QUEUE DELAYS IN SOAP MESSAGES

(75) Inventor: Harold W. Lockhart, Jr., Newton, MA (US)

(73) Assignee: BEA Systems, Inc., Redwood Shores, CA (US)

( * ) Notice: Subject to any disclaimer, the term of this patent is extended or adjusted under 35 U.S.C. 154(b) by 680 days.

(21) Appl. No.: 11/365,259

(22) Filed: Mar. 1, 2006

(65) Prior Publication Data

US 2007/0208870 A1 Sep. 6, 2007

(51) Int. Cl.
*G06F 15/16* (2006.01)
*H04L 12/26* (2006.01)

(52) U.S. Cl. .................. 709/230; 709/206; 709/207; 709/227; 709/246; 370/229; 370/230

(58) Field of Classification Search ............... 709/249, 709/206–207, 223–225, 203, 201, 228, 230, 709/238, 246, 227; 370/229–230, 352, 312
See application file for complete search history.

(56) References Cited

U.S. PATENT DOCUMENTS

| 2004/0088433 | A1* | 5/2004 | Kaler et al. ................. 709/246 |
| 2004/0177108 | A1* | 9/2004 | Connelly et al. ............ 709/201 |
| 2005/0114487 | A1* | 5/2005 | Peng et al. .................. 709/223 |
| 2005/0172171 | A1* | 8/2005 | Kadashevich ................ 714/38 |
| 2006/0168132 | A1* | 7/2006 | Bunter et al. ................ 709/219 |

OTHER PUBLICATIONS

Oasis; "Web Services Security: SOAP Message Security"; Copyright© Oasis Open 2002 http://www.oasis-open.org/committees/download.php/1686/WSS-SOAPMessageSecurity-12-04021.pdf.*
Hull et al.; "E-Services: A Look Behind the Curtain"; Copyright 2003 http://www.sigmod.org/sigmod/pods/proc03/online/003-hull.pdf?searchterm=queue+delay+%2B+soap+message.*

* cited by examiner

*Primary Examiner*—Wing F Chan
*Assistant Examiner*—Benjamin M Thieu
(74) *Attorney, Agent, or Firm*—Fliesler Meyer LLP

(57) ABSTRACT

A delay indication can be added to SOAP messages by a queue so that receiving web services get a better understanding of the SOAP message freshness.

15 Claims, 4 Drawing Sheets

REPORTING QUEUE DELAYS IN SOAP MESSAGES

BACKGROUND OF INVENTION

SOAP messages are used to interact with Web Services. Often they contain much of the state information for a Web Service. The SOAP message can contain a timestamp that can be used by receiving web service to ensure that the SOAP message is fresh. The timestamp helps avoid situations where an authentic SOAP message is copied, then later transmitted to the web service.

DETAILED DESCRIPTION

Figure 1A:
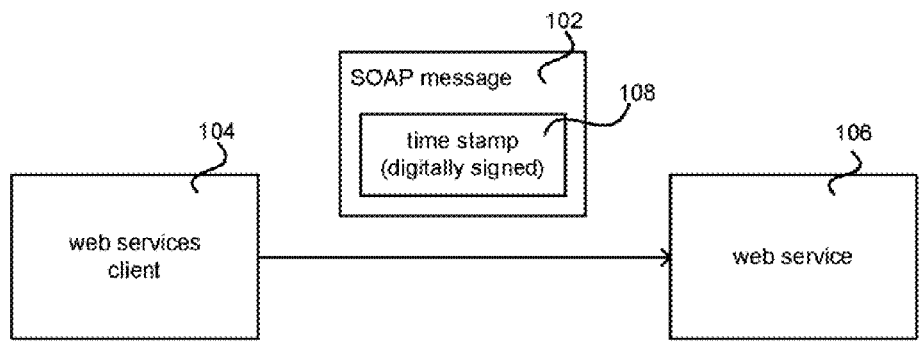
FIGS. 1A-1B shows a SOAP message being transmitted between web services.

FIG. 1A shows a system with a SOAP message 102 being sent from web services client 104 to web service 106. The SOAP message 102 can contain a timestamp 108 that can be digitally signed by web service 104. The timestamp 108 can be used to determine the freshness of SOAP message 102. If web service 106 becomes unavailable, the web service 104 would have to recreate and retransmit SOAP message 102 after the web service 106 becomes available.

Figure 1B:
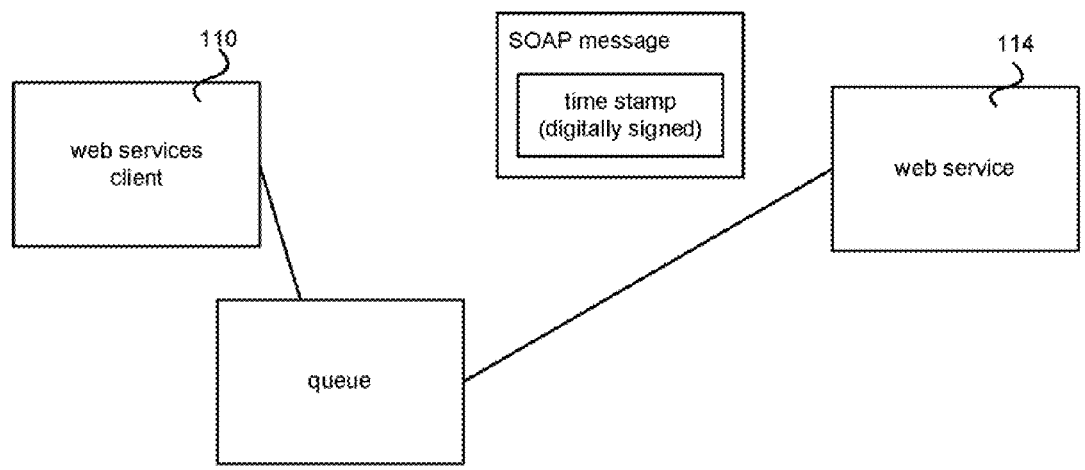

FIG. 1B shows a system where the web services client 110 puts the SOAP messages into a queue to transmit to the web service 114. The queue allows the web services client 110 to not have to worry about recreating and retransmitting the SOAP message if the web service 114 goes down.

Web Services Security (WSS) uses timestamps in several ways in order to prevent attacks based on the replay of previously transmitted information. The three main cases are:
1. Freshness—The WSS Timestamp may be included in a Security element to insure that a signature of any type was generated recently.
2. Nonce—The WSS Timestamp may be combined with a nonce in a UsernameToken to limit the number of nonces the receiver must remember.
3. Token—Various Token types contain a validity interval that limits the lifetime of the information contained in the Token. While X.509 certificates typically have a validity interval of years, for other Tokens such as Kerberos Tickets and SAML Assertions it will typically be in days or hours.

It has been widely stated that queued asynchronous transmission of messages is an important mode of operation for Web Services. If a request is made to a Service that is currently unavailable, the request can be held in a queue, until the Service is restored. The advantage is that the sender is not required to deal with retransmitting the message in the case of transient failures.

This means that from time to time messages that normally are processed in minutes or less may be held in queue for many hours or in rare cases a day or two. Unfortunately, after a delay of this length, the security processing may generate a fault, for reasons 1, 2 or 3, given above.

The normal response to the anticipation or occurrence of this event would most likely be to set the timeout to a high value, such as several days or eliminate the use of timeouts entirely. This means whatever protection is afforded by the use of timestamps is lost to deal with an event that only occurs rarely. However, the alternative of manually recovering from the timeout is likely to be inconvenient and labor intensive and result in the needless delay of important processing. It also eliminates a major benefit of using asynchronous communications in the first place.

Figure 2:
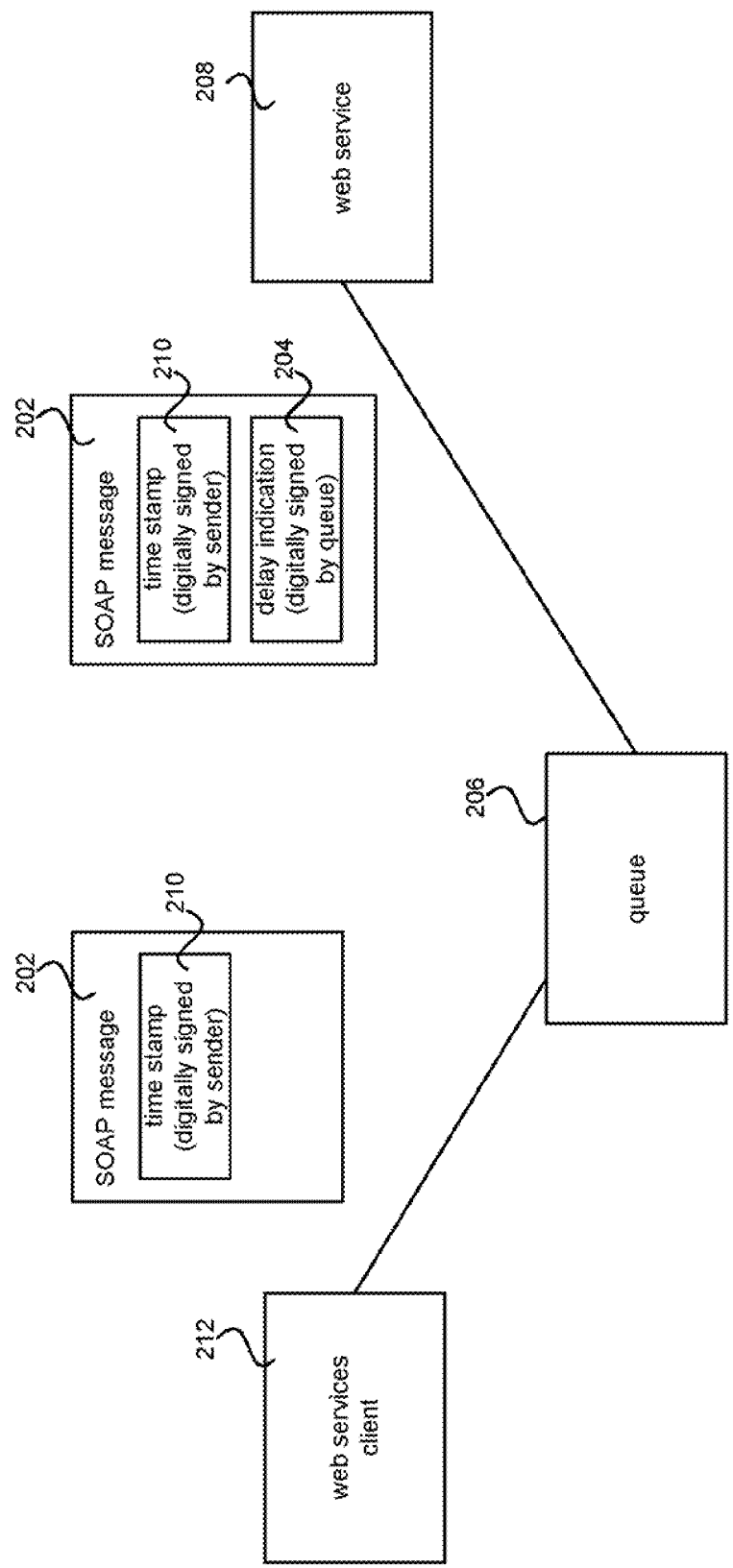
FIG. 2 shows use of a delay indication in a SOAP message.

FIG. 2 shows the use of a SOAP message with a delay indication 204. The web services client 212 creates SOAP message 202 with timestamp 210 and sends it to the queue 206. A delay indication can be added by the queue 206 to indicate the length of time the SOAP message 202 was in the queue 206. The web service 208 can use the delay indication and the timestamp 210 to determine if the SOAP message 202 is fresh. For example, the length of the delay can be subtracted from the lifetime of the SOAP message (as determined by the timestamp) to determine an effective life time that can be used to determine freshness.

Figure 3:
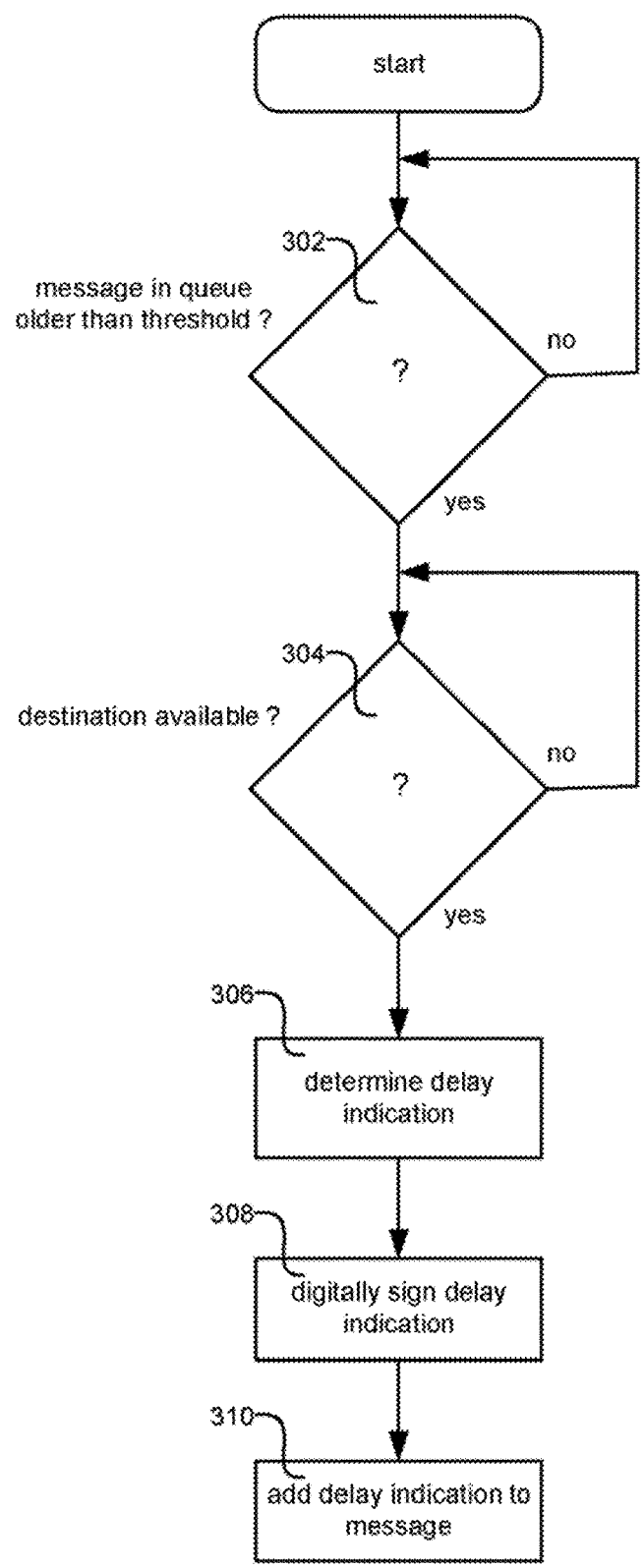
FIG. 3 is a flow chart showing an exemplary method of adding the delay indication at the queue.

FIG. 3 shows an example of a method to add a delay indication at a queue. In step 302, it is checked whether message was in the queue for greater than a threshold, such as 10 minutes. This threshold can be adjustable.

Messages held in queue for less that the threshold can be unaltered. This means there is no performance penalty in the vast majority of the messages.

If the message cannot be forwarded for longer than the threshold time period, the queuing system can mark the message so as to indicate the length of the delay. This is simple to do as most queuing systems track the arrival times of messages for various reasons, such as performance measurement. The delay could be represented as the duration, the start and end times or perhaps the start time and duration.

Step 304 checks if the destination is available. In one embodiment, the queue can just send messages until the destination becomes unavailable. The delay information can be digitally signed and critical elements, such as the SOAP message body or other, prior digital signatures also included under the same signature. Since the queuing system might have wait an extended period before being able to forward a large number of messages, an efficient method of determining whether a system is available, without actually sending a message, can be used to avoid excessive waste of resources. It may be expensive to construct and sign the delay information every time in the hope that service had just been restored. Instead a method of pinging the system or being notified reliably of its availability can be used.

In step 306, the delay is determined. In step 308, the delay indication is digitally signed. In step 310, the signed delay indication is added to the message. SOAP messages in particular have an extensible header that allows the addition of delay information. The delay information can be formatted according to an XML schema.

Figure 4:
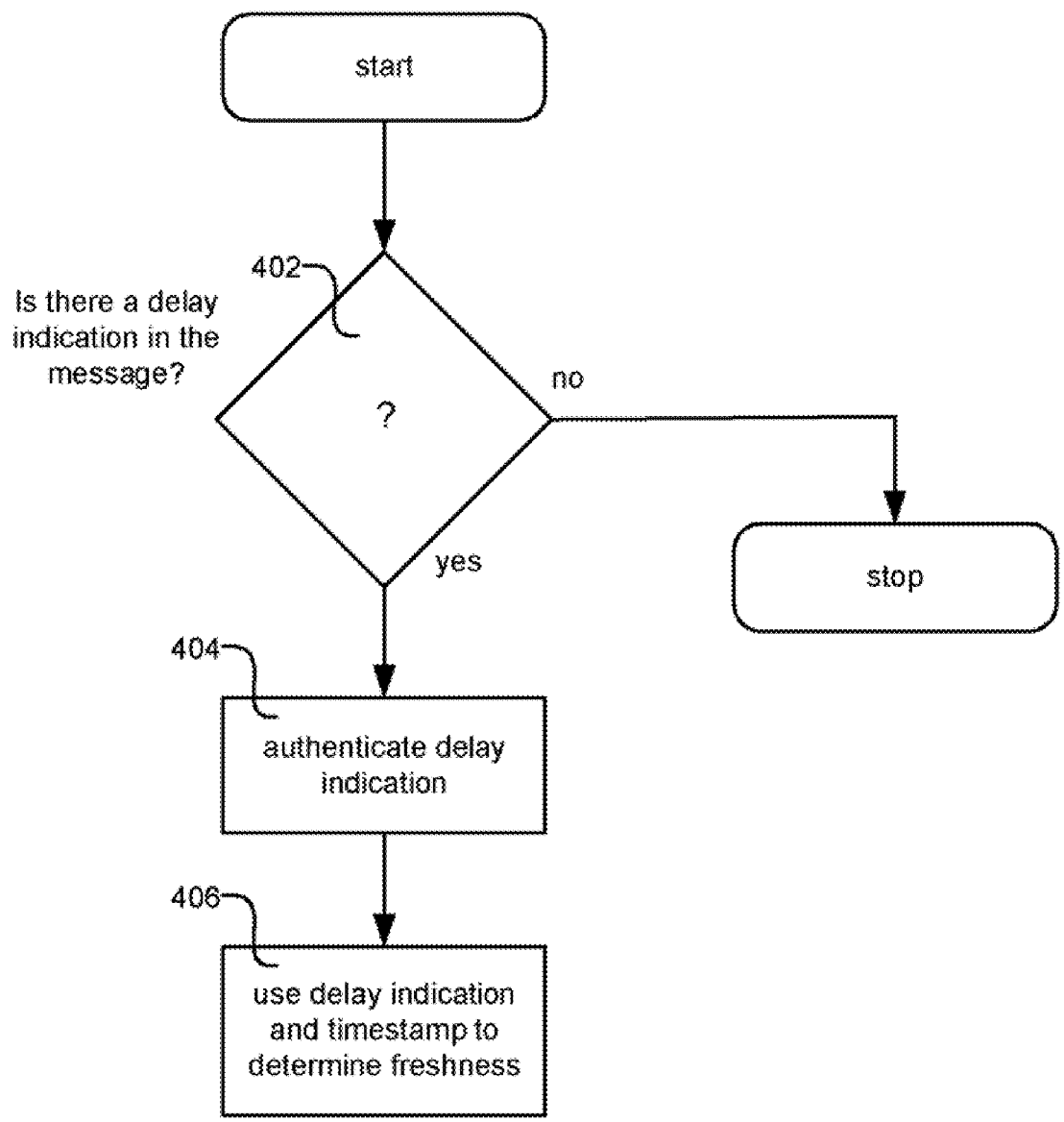
FIG. 4 is a flow chart showing an exemplary method of processing the delay indication at a web service.

FIG. 4 shows one embodiment of processing at the destination. In step 402, the web service checks for a delay indication. If there is a delay indication, in step 404 the delay indication is checked for proper authorization. In step 406, the delay and the timestamp are used to determine freshness.

One embodiment of the present invention, is a computer implemented method comprising: receiving a message at a queue. Adding a delay indication to the message, and retransmitting the message from the queue.

The message can be a SOAP message. The SOAP message can have a web service security timestamp. The SOAP message can have a web service security portion of the header that contains the delay indication. The message can be received at the queue from a web service. The delay information can be digitally signed by the queue.

The timestamp and the delay indication can be used to determine the freshness of the Message. The timestamp used to determine the lifetime of the message and this lifetime can be subtracted by the delay period to get a modified lifetime. The modified lifetime can be compared to a threshold to determine freshness. The queue can determine that a destination web service is available before the delay information is digitally signed by the queue.

In one embodiment, a computer implemented method comprises; receiving a SOAP message at a queue from a web service; adding a delay indication to the SOAP message; and retransmitting the SOAP message from the queue.

In one embodiment, a computer implemented method comprises receiving a message with a delay indication added by a queue; and using the delay indication to determine the freshness of the message.

Exemplary Schema Elements and Semantics

The following is an exemplary XML schema to indicate queue delay. Other XML schemas or protocols can be used.

/ws:Delay

This is the element for indicating message delays.

/ws:Delay/ws:Duration

This element represents the time interval that the message was delayed. It is defined as the difference between the datetime the message was received by the Asserting Party and the datetime it was sent.

/ws:Delay/ws:Received

This element represents the datetime at which the message was received by the Asserting party. When this element is present, the <ws:Duration> or <ws:Sent> element MUST also be present.

/ws:Delay/ws:Sent

This element represents the datetime at which the message was sent by the Asserting party. When this element is present, the <ws:Received> element MUST also be present.

/ws:Delay/{any}

This is an extensibility mechanism to allow additional elements to be added to the element. Unrecognized elements SHOULD cause a fault.

/ws:Delay/@wsu:Id

This optional attribute specifies an XML Schema ID that can be used to reference this Element (the delay). This is used, for example, to reference the delay in a XML Signature.

/ws:Delay/@{any}

This is an extensibility mechanism to allow additional attributes to be added to the element. Unrecognized attributes SHOULD cause a fault.

When a queuing system experiences delays in forwarding messages it SHOULD prepend a <ws:Delay> element, containing either a <ws:Duration> element or a <ws:Received> and a <ws:Sent> element or a <ws:Received> and a <ws:Duration> element to every <ws:Security> element in the SOAP Header.

The values in these elements are intended to be used in evaluating policies which check timestamps to ensure the recentness of protective operations.

The mere addition of delay information to delayed messages may not be sufficient to meet the requirements associated with the usecase. Two further steps can be done.

1. The receiver can have a trust relationship with the system providing delay information which allows it to trust the accuracy of this information. Since this system by definition is trusted not to damage or discard messages queued to it and forward messages to the correct destination, it does not seem unreasonable to trust its timekeeping.
2. The receiver's access policy can be adjusted to consider delay values in evaluating timestamps where appropriate to the goals if the evaluation.

The considerations in each of the three cases cited above are somewhat different.

1. Freshness. Here it would frequently be appropriate to adjust the creation or expiration datetime by the amount of the sum of the reported delays. For example, a signature 12 hours and 2 minutes old, with a delay of 12 hours would still meet a 10 minute freshness policy.
2. Nonce—In this case delay information may not help. If the nonce is still cached, it can be checked. If it has been discarded, retransmission will be required.
3. Token—This case requires consideration of the factors relating to the choice of token lifetime. This could include a variety of factors including: frequency of attribute change, strength of cryptographic operations, frequency of successful attacks and the time to discovery.

Typically, the most important factor would be the probability that attributes had changed during the entire period of transmission and delay. Here delay information would not be applied. Freshness is intended to prevent replay, but Tokens are usually intended to be used repeatedly. Nevertheless, it is possible to imagine situations in which adjusting for delay would be appropriate.

Other schemes are quite possible. For example, a delay could be reported by extending the SAML Assertion and providing appropriate cryptographic binding mechanisms, for example by means of a temporary key.

One embodiment includes a computer program product which is a storage medium (media) having instructions stored thereon/in which can be used to program a computer to perform any of the features presented herein. The storage medium can include, but is not limited to, any type of disk including floppy disks, optical discs, DVD, CD-ROMs, micro drive, and magneto-optical disks, ROMs, Rams, EPROM's, EPROM's, Drams, Rams, flash memory devices, magnetic or optical cards, Nano systems (including molecular memory ICs), or any type of media or device suitable for storing instructions and/or data.

Stored on any one of the computer readable medium (media), the present invention includes software for controlling both the hardware of the general purpose/specialized computer or microprocessor, and for enabling the computer or microprocessor to interact with a human user or other mechanism utilizing the results of the present invention. Such software may include, but is not limited to, device drivers, operating systems, execution environments/containers, and user applications.

The foregoing description of preferred embodiments of the present invention has been provided for the purposes of illustration and description. It is not intended to be exhaustive or to limit the invention to the precise forms disclosed. Many modifications and variations will be apparent to one of ordinary skill in the relevant arts. For example, steps performed in the embodiments of the invention disclosed can be performed in alternate orders, certain steps can be omitted, and additional steps can be added. The embodiments were chosen and described in order to best explain the principles of the invention and its practical application, thereby enabling others skilled in the art to understand the invention for various embodiments and with various modifications that are suited to the particular use contemplated. It is intended that the scope of the invention be defined by the claims and their equivalents.

The foregoing description of preferred embodiments of the present invention has been provided for the purposes of illustration and description. It is not intended to be exhaustive or to limit the invention to the precise forms disclosed. Many embodiments were chosen and described in order to best explain the principles of the invention and its practical application, thereby enabling others skilled in the art to understand the invention for various embodiments and with various modifications that are suited to the particular use contemplated. It is intended that the scope of the invention be defined by the claims and their equivalents.

What is claimed is:

1. A computer implemented method comprising:
receiving, from a web service client, a message at a queue, wherein the message is directed to a web service and includes a timestamp provided by the web service client;
determining if the web service is available, and a length of time the message is held in the queue prior to delivery to the web service, including pinging or otherwise contacting the web service to determine its availability, and
if the web is not available, then delaying forwarding the message and continuing to measure the length of time the message is in the queue, and
if the web service is available, and if the message is held in the queue longer than a threshold duration, then adding to the message a delay indication which is representative of the length of time the message is held in the queue;
forwarding the message from the queue to the web service after the length of time;
determining, at the web service, an effective lifetime of the message based on the timestamp and any delay indication specified within the message;
using the effective lifetime to determine freshness of the message, including comparing the effective lifetime of the message with a freshness policy or threshold value, and
if the effective lifetime of the message adheres to the freshness policy or threshold value then determining the message is fresh, and
if the effective lifetime of the message does not adhere to the freshness policy or threshold value then determining the message is not fresh, and
handling the message accordingly; and
wherein a processor is used to determine whether the message has been in the queue longer than the threshold duration.

2. The computer implemented method of claim 1, wherein the message is a SOAP message.

3. The computer implemented method of claim 2, wherein the SOAP message has a web service security timestamp.

4. The computer implemented method of claim 2, wherein the SOAP message has a web service security portion of the header that contains the delay indication.

5. The computer implemented method of claim 1, wherein the message is received at the queue from a web service.

6. The computer implemented method of claim 1, wherein the delay indication is digitally signed by the queue.

7. The computer implemented method of claim 1, wherein the threshold duration is adjustable, and wherein if the message is held in the queue longer than the threshold duration then modifying the content of the message to add the delay indication.

8. The computer implemented method of claim 1, wherein the step of determining an effective lifetime of the message based on the timestamp and any delay indication specified within the message includes
subtracting the length of time the message was held in the queue, as indicated by the delay indication, from the actual lifetime since the message was created, as indicated by the timestamp.

9. A computer implemented method comprising:
receiving, from a web service client, a SOAP message at a queue, wherein the SOAP message is directed to a web service, and wherein the SOAP message includes a web service security portion within the SOAP message header which includes a timestamp indicating a time the SOAP message was created by the web service client;
determining if the web service is available, and a length of time the SOAP message is held in the queue prior to delivery to the web service, including pinging or otherwise contacting the web service to determine its availability, and
if the web is not available, then delaying forwarding the SOAP message and continuing to measure the length of time the SOAP message is in the queue, and
if the web service is available, and if the SOAP message is held in the queue longer than a threshold duration, then adding to the web security portion of the header a delay indication which is representative of the length of time the SOAP message is held in the queue;
forwarding the SOAP message from the queue to the web service;
determining, at the web service, an effective lifetime of the SOAP message, by subtracting the length of time the message was held in the queue from the actual lifetime since the SOAP message was created;
using the effective lifetime to determine freshness of the SOAP message, including comparing the effective lifetime of the SOAP message with a freshness policy or threshold value, and
if the effective lifetime of the SOAP message adheres to the freshness policy or threshold value then determining the SOAP message is fresh, and
if the effective lifetime of the SOAP message does not adhere to the freshness policy or threshold value then determining the SOAP message is not fresh;
rejecting the SOAP message at the web service if it exceeds a threshold effective lifetime; and
wherein a processor is used to determine whether the SOAP message has been in the queue longer than the threshold duration.

10. The computer implemented method of claim 9, wherein the SOAP message is received at the queue from a web service.

11. The computer implemented method of claim 9, wherein the delay indication is digitally signed by the queue.

12. The computer implemented method of claim 11, wherein the queue determines that a destination web service is available before the delay indication is digitally signed by the queue.

13. The computer implemented method of claim 9, wherein the threshold duration is adjustable, and wherein if the message is held in the queue longer than the threshold duration then modifying the content of the web service security portion within the message header to add the delay indication.

14. A system for reporting delays in messages directed to a web service, comprising:
- a computer, including a processor and a web service executing thereon;
- a queue, that receives a message from a web service client, wherein the message is directed to the web service and includes a timestamp provided by the web service client; and
- wherein the system
    - determines if the web service is available, and a length of time the message is held in the queue prior to deliver to the web service, including pinging or otherwise contacting the web service to determine its availability, and
        - if the web service is not available, then delays forwarding the message and continues to measure the length of time the message is in the queue, and
        - if the web service is available, and if the message is held in the queue longer than a threshold duration, then adds to the message a delay indication which is representative of the length of time the message is held in the queue,
    - forwards the message from the queue to the web service after the length of time, and
    - determines, at the web service, an effective lifetime of the message based on the timestamp and any delay indication specified within the message, and uses the effective lifetime to determine freshness of the message, including comparing the effective lifetime of the message with a freshness policy or threshold value, and
        - if the effective lifetime of the message adheres to the freshness policy or threshold value then determines the message is fresh, and
        - if the effective lifetime of the message does not adhere to the freshness policy or threshold value then determines the message is not fresh, and
    - handles the message accordingly.

15. The system of claim 14, wherein the system determines an effective lifetime of the message based on the timestamp and any delay indication specified within the message, including
- subtracting the length of time the message was held in the queue, as indicated by the delay indication, from the actual lifetime since the message was created, as indicated by the timestamp.

* * * * *

UNITED STATES PATENT AND TRADEMARK OFFICE
CERTIFICATE OF CORRECTION

| | |
|---|---|
| PATENT NO. | : 7,664,867 B2 |
| APPLICATION NO. | : 11/365259 |
| DATED | : February 16, 2010 |
| INVENTOR(S) | : Harold W. Lockhart, Jr. |

It is certified that error appears in the above-identified patent and that said Letters Patent is hereby corrected as shown below:

In column 4, line 19, delete "Freshness." and insert -- Freshness– --, therefor.

In column 7, line 17, in claim 14, delete "deliver" and insert -- delivery --, therefor.

Signed and Sealed this

Twenty-eighth Day of September, 2010

David J. Kappos
*Director of the United States Patent and Trademark Office*

UNITED STATES PATENT AND TRADEMARK OFFICE
CERTIFICATE OF CORRECTION

PATENT NO.      : 7,664,867 B2
APPLICATION NO. : 11/365259
DATED           : February 16, 2010
INVENTOR(S)     : Harold W. Lockhart, Jr.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 855 days.

Signed and Sealed this

Seventh Day of December, 2010

David J. Kappos
*Director of the United States Patent and Trademark Office*